Figure 1:
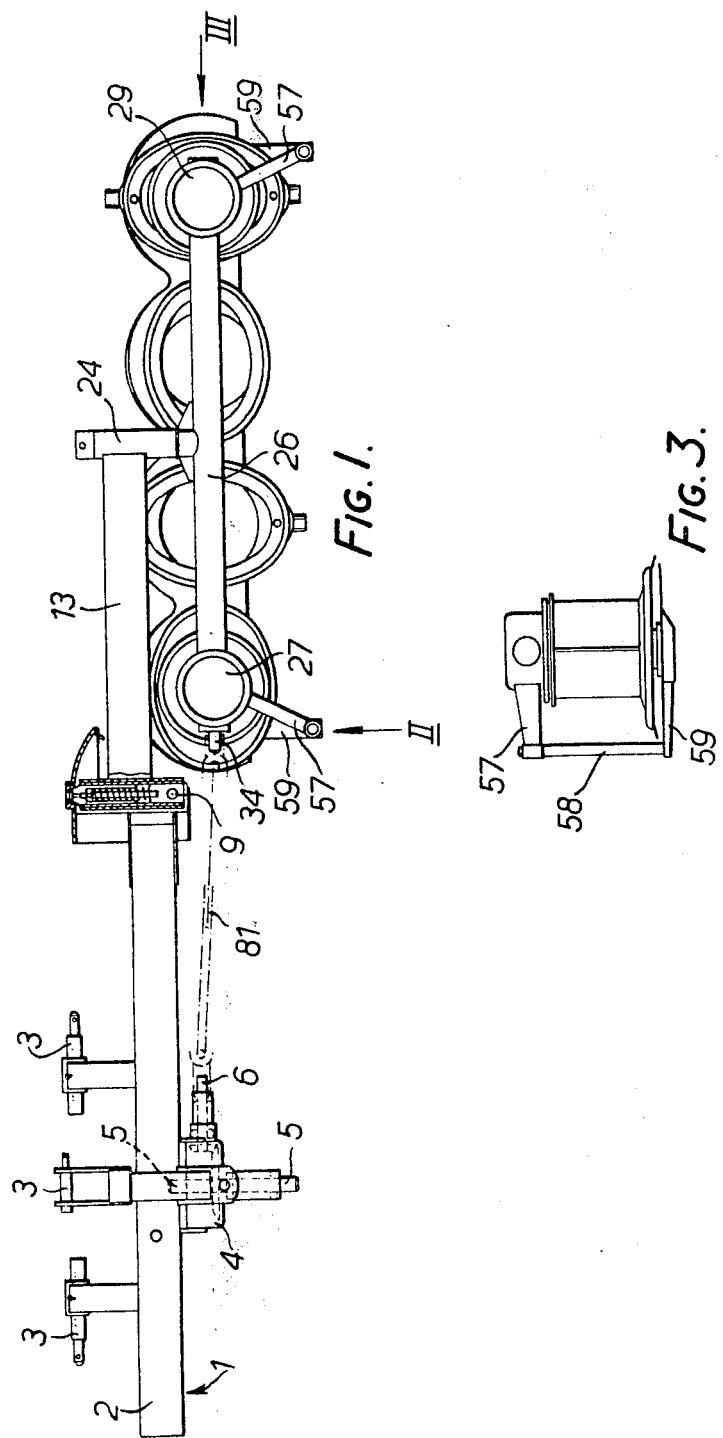

United States Patent [19]

Zweegers

[11] 4,253,294
[45] Mar. 3, 1981

[54] MOWING MACHINE

[76] Inventor: Petrus W. Zweegers, Nieuwendijk 46, Geldrop, Netherlands

[21] Appl. No.: 39,686

[22] Filed: May 16, 1979

[30] Foreign Application Priority Data

May 26, 1978 [NL] Netherlands .......................... 7805731

[51] Int. Cl.³ .......................................... A01D 35/264
[52] U.S. Cl. .................................................... 56/13.6
[58] Field of Search .................... 56/13.6, 192, 295, 6, 56/10.4, 16.2

[56] References Cited

U.S. PATENT DOCUMENTS

| 3,389,539 | 6/1968 | Zweegers | 56/13.6 |
| 3,483,685 | 12/1969 | Guillotin | 56/13.6 |
| 3,664,057 | 5/1971 | Dunn | 56/10.4 |
| 3,717,981 | 2/1973 | van der Lely | 56/13.6 |

FOREIGN PATENT DOCUMENTS

| 1582356 | 4/1970 | Fed. Rep. of Germany | 56/192 |
| 1936054 | 1/1971 | Fed. Rep. of Germany | 56/192 |

Primary Examiner—Jay N. Eskovitz
Attorney, Agent, or Firm—Edmund M. Jaskiewicz

[57] ABSTRACT

A mowing machine has a plurality of cutting members rotatably supported on a portion of the frame disposed beneath the cutting members and extending transversely to the direction of travel of the mowing machine during operation. The cutting members are driven by means of a drive shaft extending above the cutting members and journalled in the frame to be coupled to a tractor power take-off shaft. The drive shaft is directly coupled through transmission means with shafts upon which are mounted the two outermost cutting members.

12 Claims, 11 Drawing Figures

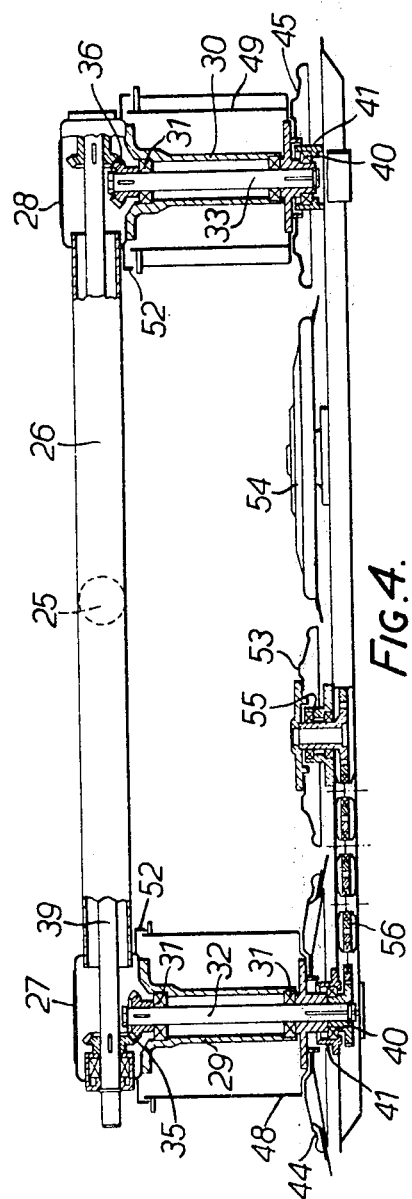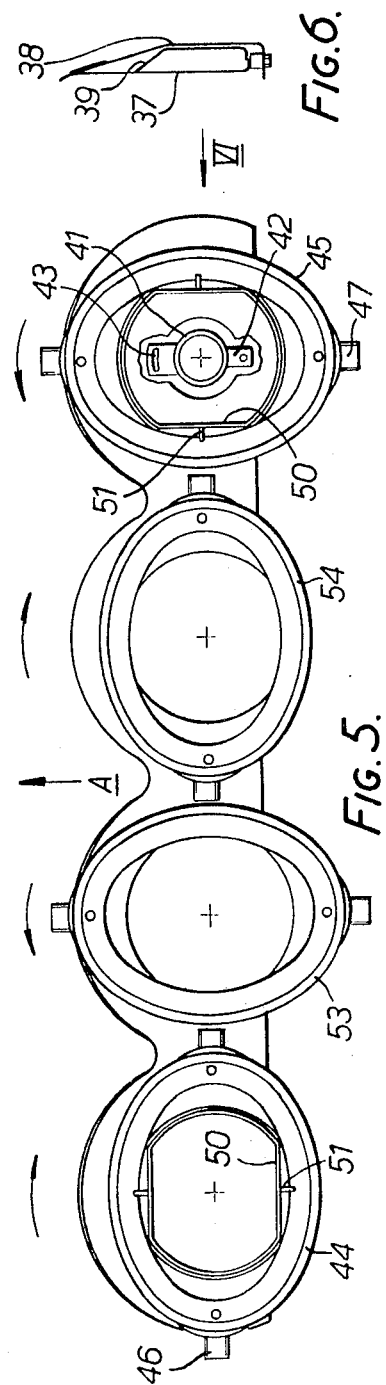

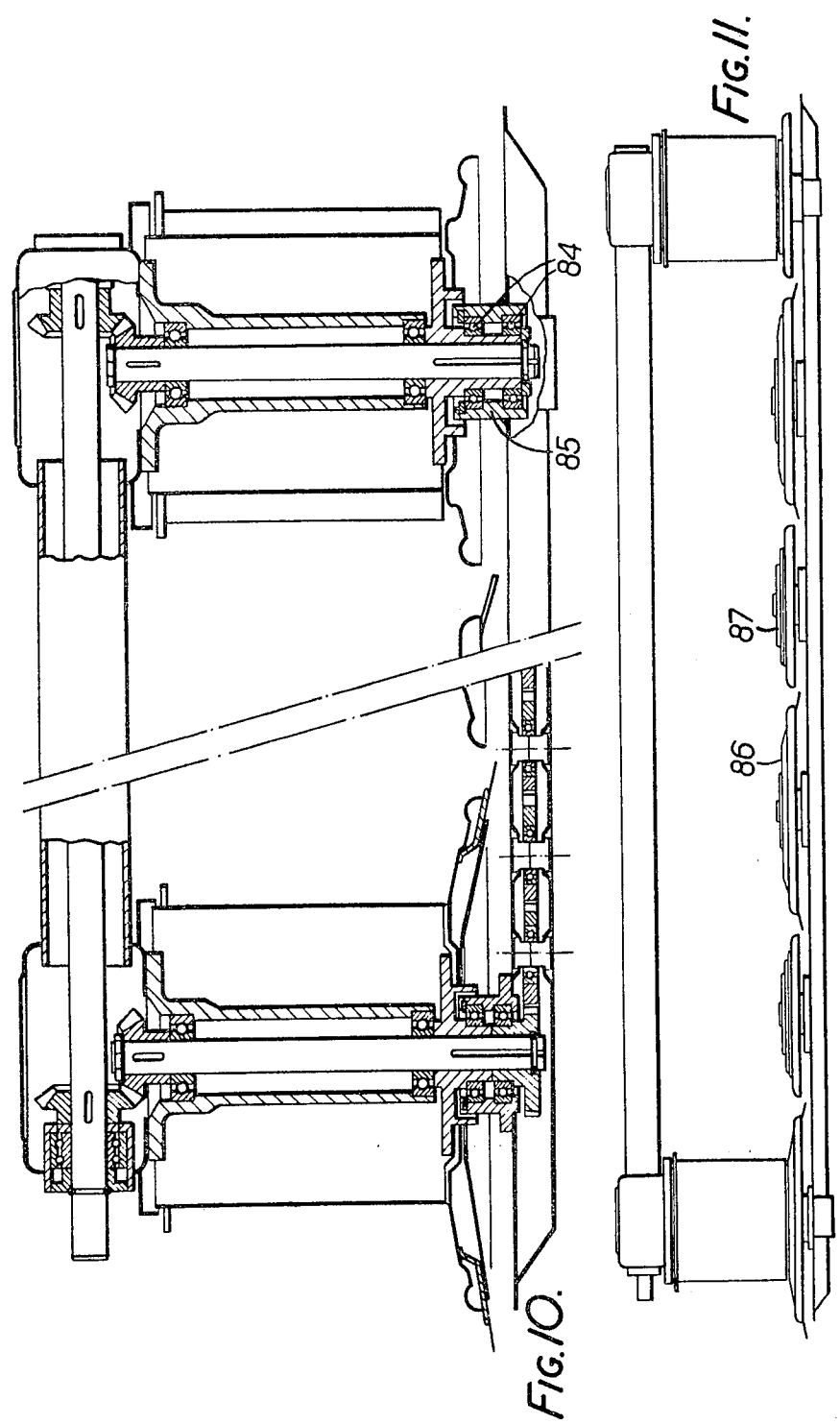

MOWING MACHINE

The invention relates to a mowing machine comprising a frame and a plurality of cutting members arranged generally in a line side by side and rotatably supported by a frame portion which is located beneath the cutting members and extending transversely of the direction of movement of the mower in operation, in which the cutting members are drivably coupled to one another and can be driven from the power take-off shaft of a tractor or the like.

In conventional mowers of this kind the power take-off shaft is coupled with the aid of an auxiliary shaft with a shaft journalled in one end of the frame portion located beneath the cutting members whilst all cutting members are coupled and driven from said end through gear pinions journalled in the hollow frame portion.

The pinions, for whose accommodation comparatively little space is available, are thus heavily loaded, particularly because the drive of the extreme cutting discs, that is to say, the cutting discs furthest remote from the connection with the power take-off shaft, requires a fairly high power, since these cutting discs are frequently provided with an upwardly protruding member for displacing the cut crop inwardly in use.

This known construction has a further disadvantage in that the connection of the auxiliary shaft with the mower, through which shaft the cutting discs are driven from the power take-off shaft, is located near the ground so that the crop may stick to the mower near said connection, which may give rise to clogging adversely affecting the operation of the machine.

The invention has for its object to provide a mowing machine of the kind set forth, in which the aforesaid disadvantages of the known mower can be alleviated.

Accordingly the present invention provides a mowing machine comprising a frame and a plurality of cutting members rotatably supported on a portion of the frame disposed beneath the cutting members and extending transversely of the direction of travel of the mower during operation, the cutting members being arranged to be driven from the power take-off shaft of a tractor or the like in which a drive shaft adapted to be coupled to the tractor power take-off shaft is provided extending above the cutting members and journalled in the frame, said drive shaft being directly coupled through a transmission means with the shafts carrying the two outermost cutting members.

By using the construction according to the invention an effective structure of the mower can be obtained, in which owing to the direct drive of the two outermost cutting members high loading of the pinions driving the intermediate cutting members is avoided.

The driving shaft is preferably arranged in a frame beam which extend transversely of the direction of movement of the mower during normal operation and is coupled near its centre with the further part of the mower with the aid of a pivotal shaft extending in the direction of movement.

By using this construction the mower can satisfactorily match the ground surface, since at the two ends of the frame portion carrying the cutting discs the pressure of the mower on the ground may be the same, in contrast to the conventional suspension in which the pressure of the frame portion carrying the cutting discs on the ground is usually heavier at one end of said frame portion than at the other end thereof. The connection of the frame portion carrying the cutting members with the further part of the mower may furthermore be arranged at a suitable height above the cutting members in contrast to the conventional construction in which the coupling frequently lies near the ground at one end of the frame portion carrying the cutting members, which may give rise to accumulation of crop near said coupling point.

Figure 2:
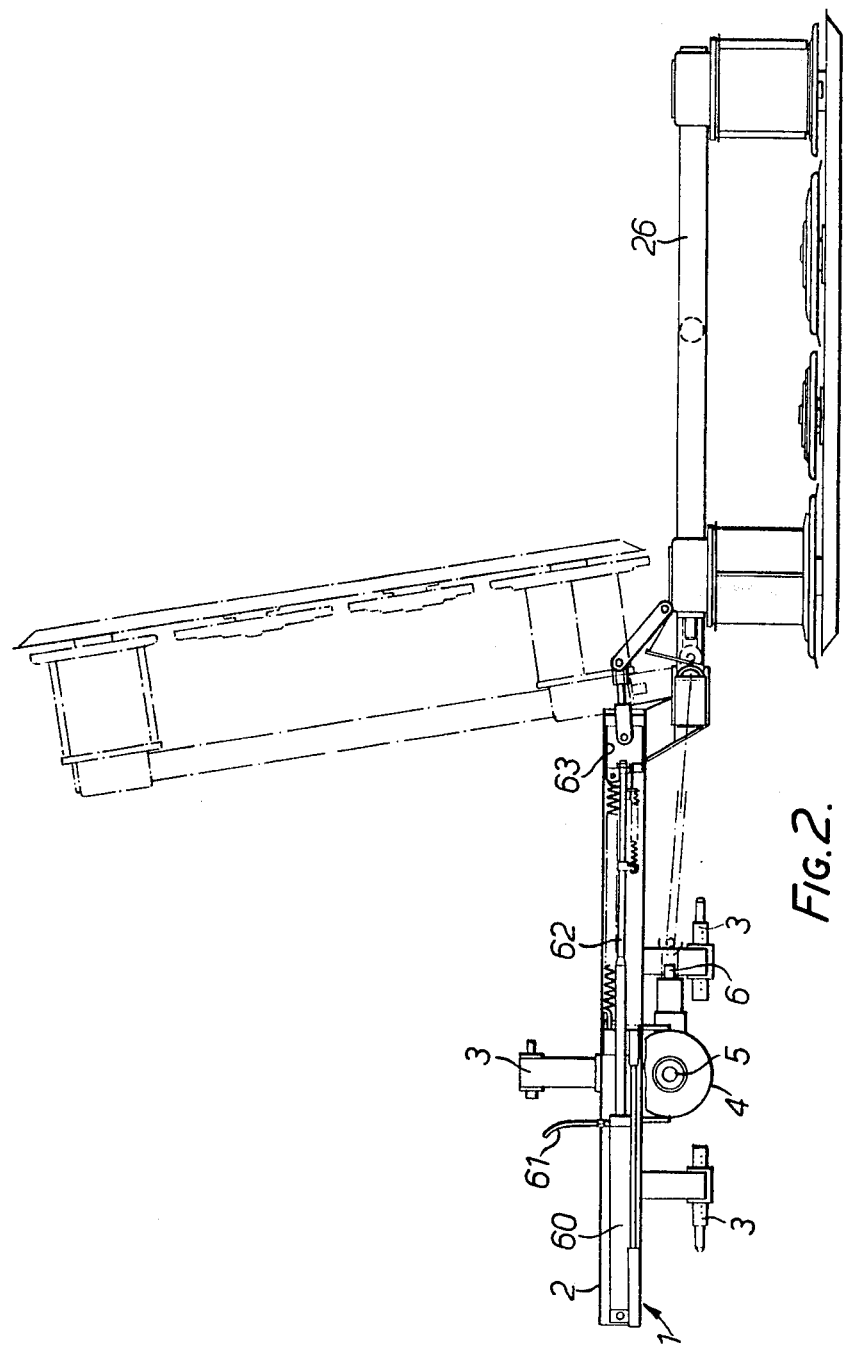
Figure 7:
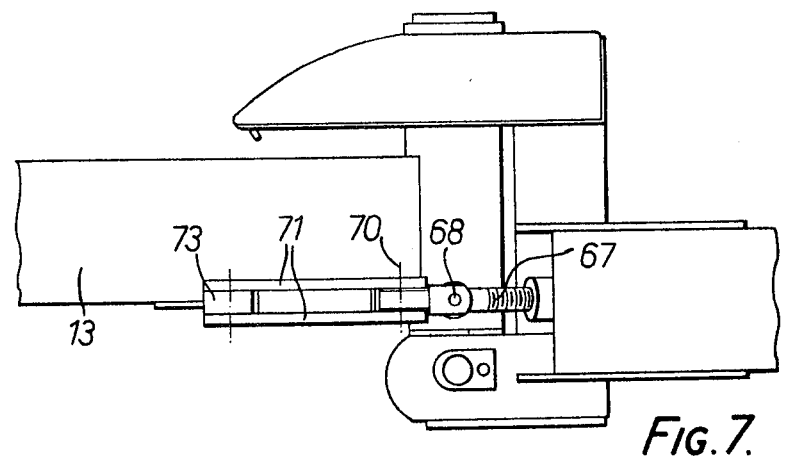
Figure 8:
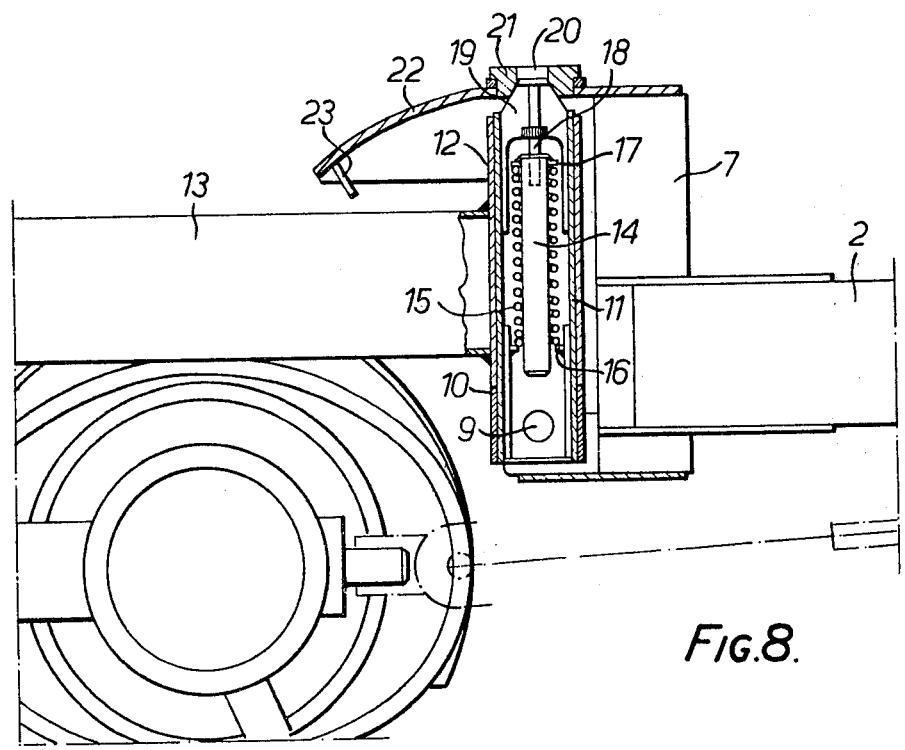
Figure 9:
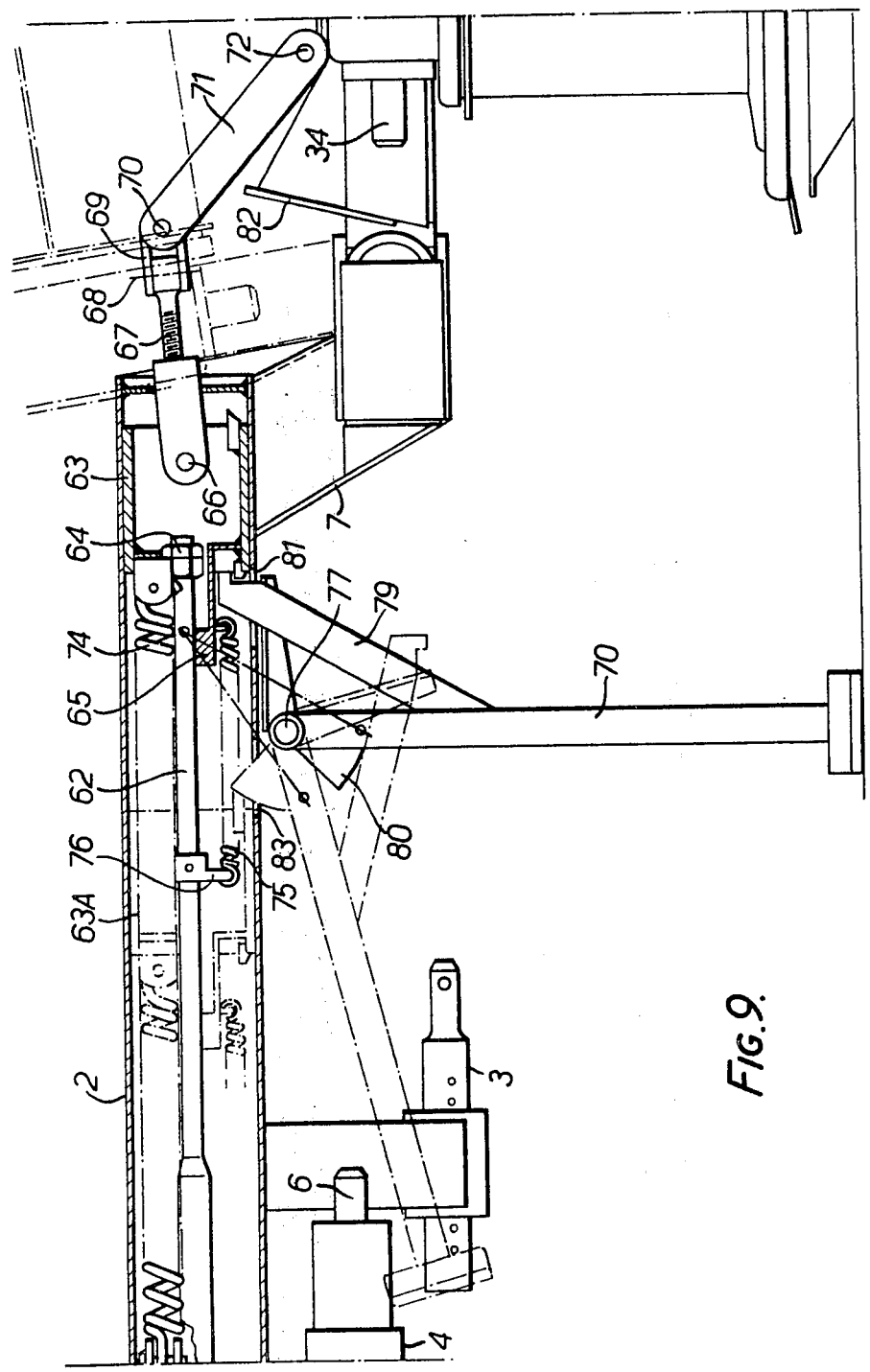

In order to promote a fuller understanding of the above and other aspects of the invention some embodiments will be described hereinafter with reference to the accompanying drawings in which:

FIG. 1 is a schematic plan view of a first embodiment of a mower in accordance with the invention, FIG. 2 is an elevational view of the machine shown in FIG. 1 in the direction of the arrow II in FIG. 1, FIG. 3 is an elevational view of the machine shown in FIG. 1 in the direction of the arrow III in FIG. 1, FIG. 4 is on an enlarged scale partly an elevational view and partly a sectional view of the frame portion carrying the cutting members of the machine shown in FIGS. 1 to 3, FIG. 5 is a plan view of the machine of FIG. 4, certain parts being omitted, FIG. 6 is a side elevation of the frame portion located beneath the cutting members in the direction of the arrow VI in FIG. 5, FIG. 7 is a plan view of a connection between two frame portions on an enlarged scale, FIG. 8 is partly a sectional view of the construction shown in FIG. 7, FIG. 9 is an enlarged sectional view of part of the frame portion adapted to be coupled with a tractor, FIG. 10 is partly an elevational view and partly a sectional view of a second embodiment of the frame portion supporting the cutting members.

FIG. 11 is partly a sectional view and partly an elevational view of a further embodiment of a mowing machine in accordance with the invention comprising six cutting members.

The mowing machine illustrated in FIGS. 1 to 9 comprises a first frame portion 1 to be coupled with a tractor or the like having a hollow horizontal frame beam 2 extending transversely of the direction of movement of the mower during normal operation, said beam having secured to it conventional connecting members 3 for hitching the mower to the lifting device of a tractor. The frame beam 2 is furthermore provided with a gear box 4 comprising an input shaft 5 adapted to be coupled in a conventional manner with the aid of an auxiliary shaft with the power shaft of a tractor or the like and an output shaft 6, through which the cutting discs of the mower can be driven in a manner to be described more fully hereinafter.

To one end of the frame beam 2 is secured a support 7 (FIGS. 7, 8), with which are coupled with the aid of a vertical shaft 9 a sleeve 10 and a sleeve 11 located in said sleeve 10 and projecting from said sleeve 10. The coinciding centre lines of the sleeve 10 and 11 extend horizontally and at right angles to the frame beam 2. The portion of the sleeve 11 projecting out of the sleeve 10 is surrounded by a sleeve 12, which is freely rotatable around the sleeve 11 and which is secured to the end of a frame beam 13, which is parallel to the frame beam 2, viewed on plan. The sleeve 11 holds a pin 14 surrounded by a compression spring 15, which bears at one end on stops 16 rigidly secured to the sleeve 11 and at the other end on stops 17 secured to the pin 14. Into the end of the pin 14 remote from the shaft 9 is screwed a bolt 18, which is fastened to a locking member 19, whose end protruding from the sleeve 11 has more or less the shape of a truncated cone. This frusto-conical end is located, in the normal working position of the machine illustrated in the Figures, in a correspondingly shaped recess 20 of a ring 21, which is secured to a plate 22 fastened to the support 7 and being concentrical with the pin 9 over part of its length, the end of the plate 22 being provided with a stop 23 (FIGS. 7, 8).

To the end of the frame beam 13 remote from the sleeve 12 is fastened a sleeve 24 exending parallel to the sleeve 12. This sleeve holds a shaft 25, which is fastened in the middle of a hollow frame beam 26. The construction is such that the shaft 25 with the frame beam 26 fastened thereto can freely turn in the sleeve 24 through a limited angle.

The ends of the hollow frame beam 26 are provided with gear boxes 27 and 28 respectively. To the bottom sides of the gear boxes are fastened hollow bodies 29 and 30 respectively, in which vertical shafts 32 and 33 respectively are journalled with the aid of bearings 31.

In the gear boxes 27 and 28 are journalled the ends of a driving shaft 34 located in the frame beam 26 and projecting out of the gear box 27. The driving shaft 34 is linked through pinion transmissions 35 and 36 located in the gear boxes 27 and 28 to the vertical shafts 32 and 33.

At a given distance beneath the frame beam 26 is located a frame portion comprising a flat, horizontal top plate 37, whose rear side, viewed in the direction of movement of the device indicated by the arrow A during normal operation, is straight and at right angles to the direction of movement, whereas the front side has a wave-shaped form clearly shown in FIG. 5.

The front side of the top plate is joined by the front edges of skids 38, which first extend from the front side of the plate 37 downwards and rearwards in an inclined position and then change into horizontal portions, whereas the rear ends are bent over at right angles (FIG. 6).

Between the top plate 37 and the skids 38 is located an intermediate plate 39 fastened to the top plate 37 with which it constitutes a gear box.

The lower ends of the shafts 32 and 33 are each journalled with the aid of a single ball bearing 40 in sleeves 41 fastened to the top plate. From FIG. 5 it will be apparent that the sleeves 41 are provided with ears 42 for fastening the sleeves 41 to the plate 37. At least one of the ears has an elongated hole 43 for receiving a fastening bolt so that the support for the lower end of the vertical shaft is adjustable. This has the advantage that the manufacture does not require very strict tolerances, which would be the case, if the bearing sleeve 41 could be fixed in only one position relative to the frame portion supporting the bearing sleeve.

The lower ends of the shafts 32 and 33 have secured to them cutting members having elliptical cutting discs 44 and 45 and cutters 46 and 47 respectively. Above the cutting discs drums 48 and 49 respecively are adapted to turn with the cutting discs, said drums having flattened sides 50 (see FIG. 5) to which are fastened outwardly projecting fillets 51, extending parallel to the rotary axis of the drum. The drums 48 and 49 extend upwards from the cutting discs to closely below the beam 26, whereas on the top side they are covered by cover rings 52 fastened to the gear boxes 27 and 28.

Between the two cutting discs 44 and 45 are arranged two further mowing members formed by cutting discs 53 and 54, journalled in bearings 55 fastened to the plate 37. The cutting discs 53 and 55 are driven from the shaft 32 through the pinions 56 arranged in the hollow frame portion formed by the plates 37 and 39. The structure is such that two neighbouring cutting members 44 and 53, 45 and 54 respectively rotate in opposite senses as is indicated by arrows in FIG. 5.

In order to obtain a sufficiently rigid assembly, as will be particularly apparent from FIGS. 1 and 3, the gear boxes 27 and 28 have fastened to them rearwardly extending arms 57, which are connected with the aid of vertical beams 58 with arms 59 extending rearwards from the frame portion formed by the plates 37 to 39 and located beneath the cutting members.

FIGS. 2 and 9 illustrate specifically that the hollow frame beam 2 holds a single-action hydraulic ram 60, to which fluid can be supplid through a conduit 61. The end of the piston rod 62 of said ram remote from this ram is located in a sleeve 63 slidably arranged in the frame beam 2, the arrangement being such that in the normal working position indicated by solid lines in FIGS. 2 and 9 nuts 64 screwed onto the ends of the piston rod 62 are located at a given distance from a stop 65 secured to the sleeve 63, with which the nuts cooperate for a displacement of the sleeve 63 with the aid of the ram 60 in a manner to be described more fully hereinbelow.

With the aid of a horizontal pivotal pin 66 the end of a coupling rod 67 is coupled with the sleeve 63. The coupling rod 67 is coupled with the aid of a pin 68 crossing the pin 66 at right angles with a fork 69, which is coupled, in turn, with the aid of a pin 70 extending parallel to the pin 66 with two coupling rods 71, whose ends remote from the fork are coupled with the aid of a pin 72 extending parallel to the pin 70 with an ear 73 secured to the frame beam 13 (FIG. 7).

To the sleeve 63 is furthermore fastened the end of a tensile spring 74, the other end of said tensile spring accommodated in the frame beam 2 being fastened to the frame beam. A further tensile spring 75, which is considerably weaker than the tensile spring 74, is arranged between the sleeve 63 and an arm 76 fastened to the piston rod 62.

With the aid of a shaft 77 extending horizontally and at right angles to the direction of length of the frame beam 2 a support 78 is pivoted to the frame beam 2. On one side of the support 78 is fastened a projecting arm 79 for a purpose to be described more fully hereinafter and on the other side there is provided a protruding nose 80.

FIGS. 1 and 2 schematically show that the output shaft 6 of the gear box 4 is coupled normally with the aid of a telescopic auxiliary shaft 81 with the end of the driving shaft 34 of the cutting members projecting out of the gear box 27.

For normal operation the mowing machine described above is coupled by means of the coupling members 3 with the three-point lift of a tractor or the like. The mower will be in the position indicated by solid lines in FIGS. 1 and 2, in which the frame portion supporting the cutting members bears on the ground by the shoes 38. The device is moved in the direction of the arrow A (FIG. 5). The drive of the cutting members is performed via the gear box 6, the auxiliary shaft 81 and the driving shaft 34, whilst the innermost cutting member 44, that is to say, the cutting member located nearest the tractor or the like is driven from the shaft 34 through the pinion transmission 35 in the gear box 27 and the two medium cutting members are driven from the shaft 32 of the innermost cutting member 44 through the pinions 56 located in the hollow frame portion located beneath the cutting members. The outermost cutting member 45, however, is directly driven from the shaft 34 via the pinion transmission 36 in the gear box 28. This is important since the drive of said cutting member requires a comparatively high power, particularly because this cutting member comprises a drum 49 for the inward displacement of the cut crop. Therefore, if this outermost cutting member 45 were also driven through the pinions 56, these pinions would be very heavily loaded, which would adversely affect the lifetime of the device.

The device can satisfactorily match unevennesses of the ground, since the frame portion supporting the cutting members is freely rotatable through a given angle with respect to the arm 13 about the shaft 25 at the centre of the beam 26. Since the shaft 25 is disposed near the centre of the beam, there will be practically no differences between the pressures of the two ends of the frame portion 37 to 39 located beneath the cutting discs on the ground so that undesirable damage of the stubbles and soiling of the crop are avoided.

An additional advantage of the construction according to the invention resides in that both the coupling point of the auxiliary shaft 81 with the driving shaft 34 and the coupling point of the frame portion supporting the cutting members with the shaft 25 and the sleeve 24 are located at a comparatively large distance above the ground surface, since said coupling points are located at the level of the frame beam 26. In this manner in contrast to the conventional mowing device of the kind concerned there are no stationary frame portions at the level of the cutting members near the latter, where crop could attach.

The frame portion supporting the cutting members is carried by the frame beam 13, which is freely rotatable about the sleeve 11 fastened to the frame beam 2 and connected with the aid of the coupling rods 67, 71 with the sleeve 63, which is displaceable in the frame beam 2. The design is such that at least part of the weight of the frame beam 13 and of the parts supported by said frame beam is compensated for by the spring 74 fastened to the sleeve 63 in order to prevent the frame portion supporting the cutting discs from bearing on the ground with excessive pressure.

If the frame portion supporting the cutting discs encounters an obstacle during operation, the force exerted on said frame portion may increase to an extent such that the locking member 19 is urged out of the recess 20 concerned against the force of the spring 15 and the arm 13 with the frame portion supporting the cutting discs is turned about the shaft 9 in clockwise direction, as viewed in FIG. 1 so that the end of the locking member will slide along the plate 22 until the outer side of the sleeve 12 comes into contact with the stop 23 for limiting the deflection of the beam 13 and of the frame portion supporting the cutting members. It will be obvious that this locking device allowing a deflection of the frame portion supporting the cutting members has a very compact structure owing to its arrangement in the pivotal joint between the frame beam 13 and the frame beam 2, whilst in addition this locking member is satisfactorily protected in the sleeves 11 and 12 so that adhesion of soil and crop thereto is avoided.

As a matter of course, the support 78 is tilted upwards into the position indicated by broken lines in FIG. 9 during operation. If it is desired to put down the device, the support can be turned into the position indicated in FIG. 9 by solid lines, in which the top end of the arm 79 extends into the beam 2, for which purpose the bottom side of said beam has an opening 81. From FIG. 9 it will be apparent that the end of the arm 79 located inside the frame beam 2 is located opposite an end of the sleeve 63 displaceable in the frame beam 2 so that, as shown in FIG. 9, the sleeve 63 cannot shift in place to the left. Owing to the co-operation of the sleeve 63 with the arm 79 of the support 78 the arm 13 is prevented from turning upwards, when the mower is put down and will thus bear on the frame portion located beneath the cutting members and on the support 78, whilst in addition the support 78 is firmly held in the position in which the frame is supported.

For transport purposes the arm 13 with the frame portion supporting the cutting discs can be tilted up with the aid of the ram 60 into the position indicated by broken lines in FIG. 2. For this purpose pressurized fluid is supplied through the conduit 61 to the ram 60 so that the piston rod 62 is drawn to the left, viewed in FIGS. 2 and 9. The sleeve 63 is thus also drawn to the left into the position 63a indicated by broken lines in FIG. 9. The frame beam 13 thus turns upwards in anticlockwise direction, viewed in FIG. 9, until a stop 82 fastened to said frame beam comes into contact with the support 7 fastened to the frame beam 2. Since the frame portion supporting the cutting members can turn only through a limited angle with respect to the frame beam 13, also this frame portion will be moved into the position indicated in FIG. 2 by broken lines during the upward turn.

In this transport position, when the support 78 is tilted up, the nose 80 fastened to the support 78 will extend into the frame beam 2 through an opening 83 provided to this end in the frame beam 2, the nose 80 thus arriving at the sleeve 63a so that the nose 80 prevents backward displacement of the sleeve 63 and hence a downward turn of the frame beam 13 and of the frame portion supporting the cutting discs. If after the downward turn of the support 78 the pressurized fluid is allowed to escape from the ram 60, the frame beam 13 and the frame portion supporting the cutting members will return into the working position, whilst the spring 75 ensures that the piston rod 62 is fully withdrawn so that again the desired distance between the nuts fastened to the piston rod and the stop 65 fastened to the sleeve co-operating for lifting said nuts is obtained.

Since the mechanism for lifting the frame beam 13 and the frame portion supporting the cutting members inside the frame beam 2, said parts are satisfactorily protected, whilst at the same time a compact structure and an attractive appearance of the mowing machine are acquired.

The embodiment of a mowing device in accordance with the invention shown in FIG. 10 corresponds at least largely with the mowing device depicted above and corresponding parts are, therefore, designated by the same reference numerals. In this embodiment, however, the lower ends of the shafts 32 and 33 are supported in two superjacent ball bearings 84 in a bearing housing 85 rigidly secured to the frame portion located beneath the cutting members. The connection established via the shafts 32 and 33 between the frame beam 26 and the frame portion 37 to 39 located beneath the cutting members will generally be sufficiently rigid so that the stiffening members 57 to 59 (FIG. 3) used in the preceding embodiment may be omitted.

The device shown only partly in FIG. 11 corresponds largely with the device described above and corresponding parts are designated by the same reference numerals. The sole difference of the device shown in FIG. 11 from the device described in the foregoing resides actually in that it is furthermore provided with two additional cutting discs 86 and 87 forming cutting members and rotating in opposite senses so that the device comprises six cutting members.

Although it is described in the foregoing that the cutting members located between the two outermost cutting members are driven from the innermost cutting member located nearest the tractor, it is alternatively possible, for example, to drive the cutting member neighbouring the outermost cutting member via a pinion transmission from the outermost cutting member, which may be desirable in some cases, when a large number of further cutting members are arranged between the two outermost cutting members.

I claim:

1. A mowing machine comprising a frame, a hollow frame beam extending from said frame in a direction transversely to the direction of movement of the machine during normal operation, a hollow frame member spaced vertically below said hollow frame beam and parallel thereto, a plurality of cutting members rotatably supported on said hollow frame member, said cutting members comprising first and second outer members and at least one other cutting member between said outer cutting members, said outer cutting members each being mounted on a shaft and said shafts having their upper ends journaled in said hollow frame beam, drums rotating with said outer cutting members and surrounding said shafts, a drive shaft within said hollow frame beam drivingly connecting said outer cutting member shafts, a plurality of pinion gears within said hollow frame member drivingly interconnecting said other cutting members with one of said outer cutting members, and means on said frame for drivingly interconnecting said drive shaft and a power take-off shaft of an agricultural tractor.

2. A mowing machine as claimed in claim 1 and further comprising a pivotable shaft extending in the direction of movement of said machine and connecting a central portion of said hollow frame beam with a further portion of said frame.

3. A mowing machine as claimed in claim 1 in which at one end the drive shaft projects out of the hollow frame beam for a connection with further driving members.

4. A mowing machine as claimed in claim 1 in which the lower end of the shaft carrying the outermost cutting member is supported in a bearing, which is adjustably fixed in the hollow frame portion located beneath the cutting members.

5. A mowing machine as claimed in claim 4 in which the ends of the hollow frame beam holding the drive shaft and of the frame portion located beneath the cutting members have fastened to them rearwardly extending arms, which are inter-connected by rigid tie members.

6. A mowing machine as claimed in claim 2 in which the frame beam accommodating the drive shaft is coupled near its centre with the end of a tie beam, the other end of which is pivotally coupled by means of a pivotal shaft also extending in the direction of movement with a frame portion of the mower to be coupled with a tractor or the like.

7. A mowing machine as claimed in claim 6 in which the tie beam is adapted to turn about a sleeve, which is coupled with the aid of a vertical pivotal shaft with the frame portion to be coupled with the tractor or the like, said sleeve accommodating a spring-loaded locking member, the end of which is located in a recess in a plate fastened to the frame portion to be coupled with the tractor, the arrangement being such that if the force exerted during operation on the frame portion supporting the cutting members exceeds a given value, said frame portion together with the tie beam can turn to the rear about the vertical pivotal shaft, since the locking member is urged out of the recess concerned against the action of the spring.

8. A mowing machine as claimed in claim 6 in which the frame portion to be coupled with the tractor comprises a hollow frame beam accommodating a hydraulic ram, the piston rod of which is coupled with a sleeve displaceable in said frame beam and coupled with the aid of coupling rods with the tie beam, said sleeve being displaceable with the aid of the ram in the frame beam for turning upwards the tie beam and the frame portion supported by the tie beam and carrying the cutting members into a transport position.

9. A mowing machine as claimed in claim 8 in which with respect to the piston rod the sleeve is freely slideable into the position ocupied by the sleeve in the transport state, the hollow frame beam holds a spring mechanism tending to move the sleeve into said position.

10. A mowing machine as claimed in claim 8 in which between the piston rod and the sleeve is arranged a spring located in the hollow frame beam and tending to move the sleeve towards the hydraulic ram, whilst the end of the piston rod located in the sleeve is provided with a stop co-operating with a stop fastened to the sleeve, the arrangement being such that in normal operation the two stops are located at a given distance from one another.

11. A mowing machine as claimed in claim 8 in which the machine comprises a support adjustably connected with the machine frame for holding the machine in position out of operation, said support having fastened to it a stop which extends in the hollow frame beam, when the support is holding the machine, at a point located between the ram and the sleeve, when the sleeve occupies the normal working position.

12. A mowing machine as claimed in claim 10 in which the support is provided with a second stop extending, when the support is moved into the position during the operation of the mower, in the hollow frame beam at a point located on the side of the sleeve remote from the hydraulic ram, when the frame portion supporting the cutting members is tilted up into the transport position.

* * * * *